United States Patent [19]

Miller

[11] Patent Number: 5,739,974
[45] Date of Patent: Apr. 14, 1998

[54] SYSTEM FOR CALIBRATING A MAGNETIC TAPE DRIVE

[75] Inventor: Kevin L. Miller, Loveland, Colo.

[73] Assignee: Hewlett-Packard Company, Palo Alto, Calif.

[21] Appl. No.: 28,741

[22] Filed: Mar. 9, 1993

[51] Int. Cl.⁶ .......................................... G11B 5/55
[52] U.S. Cl. ............................. 360/78.02; 360/75
[58] Field of Search .................... 360/75, 77.12, 360/77.06, 77.04, 78.02

[56] References Cited

U.S. PATENT DOCUMENTS

| | | |
|---|---|---|
| 3,353,168 | 11/1967 | Poumakis . |
| 3,731,177 | 5/1973 | Commander et al. . |
| 3,800,317 | 3/1974 | Lin . |
| 4,085,429 | 4/1978 | Hasegawa . |
| 4,136,365 | 1/1979 | Chick et al. . |
| 4,204,234 | 5/1980 | Noble ................... 360/77.06 |
| 4,313,141 | 1/1982 | Yanagida . |
| 4,476,503 | 10/1984 | Solhjell . |
| 4,563,713 | 1/1986 | Cahoon et al. . |
| 4,581,663 | 4/1986 | Tanaka .................. 360/77.12 |
| 4,609,959 | 9/1986 | Rudi . |
| 4,622,603 | 11/1986 | Mizunuma et al. . |
| 4,679,104 | 7/1987 | Dahlerud ................ 360/78.02 |
| 4,802,030 | 1/1989 | Henry et al. . |
| 4,866,548 | 9/1989 | Rudi ..................... 360/78.02 |
| 5,001,580 | 3/1991 | Aranovsky et al. . |
| 5,257,252 | 10/1993 | Barnes et al. ........... 360/77.06 |
| 5,311,390 | 5/1994 | Nayak et al. ............ 360/78.02 |
| 5,343,341 | 8/1994 | Jahren .................. 360/77.12 |
| 5,457,586 | 10/1995 | Solhjell ................ 360/75 X |

FOREIGN PATENT DOCUMENTS

| | | |
|---|---|---|
| 0051754 | 5/1982 | European Pat. Off. . |
| 2327031 | 12/1974 | Germany . |
| 3032797A1 | 4/1982 | Germany . |
| 59-185020 | 10/1984 | Japan . |
| 827667 | 2/1960 | United Kingdom . |

OTHER PUBLICATIONS

Japan Patent Abstract –58–218031 of Masayuki Satou; Magnetic Tape Storage Device; Dec. 19, 1983; vol. 8, No. 72 (P–265) (1509) Apr. 4, 1984.

Japan Patent Abstract –55–97025 of hideaki Koiwai "Positioning Device Using Microcomputer"; vol. 4, No. 149 (P–32) (631), Oct. 21, 1980.

Japan Patent Abstract 57–152515 (A) of Tomoshisa Yoshimaru; Tracking System; vol. 6, No. 255 (P–162) (1133); Dec. 14, 1982.

8013 J. Audio Engineering Society vol. 25, No. 12 (1977 12) pp. 1041–1044. A Uniform Track Positioning & Dimensioning System for Magnetic Recording, by E.R. Hanson.

*Primary Examiner*—Aristotelis Psitos
*Assistant Examiner*—James L. Habermehl

[57] ABSTRACT

A system for calibrating a magnetic tape drive for accurate movement of a tape head or drive motor accommodates mechanical and manufacturing inaccuracies. Motion is corrected through sensing variations from desired position or speed through operation of the drive in one continuous motion. These values may then be processed or filtered to remove non-repeatable effects and thus achieve appropriate correction in operation. The values may be written to a ROM in tabular format correlating position correction values with track number or adjusting speed coefficients for use during operation. For the tape head, actual position values are sensed in one substantially continuous motion of the tape head through a move command for faster calibration.

3 Claims, 3 Drawing Sheets

SYSTEM FOR CALIBRATING A MAGNETIC TAPE DRIVE

BACKGROUND OF THE INVENTION

Generally this invention relates to methods and apparatus for calibrating drives which access and store information on magnetic tape media. Specifically the invention involves improvements which obtain more accurate operation in use by measuring actual variations and utilizing these to create corrections to be used in operation. The invention has particular application in situations involving multi-track, and removable tape cartridges.

The use of magnetic tape as an information storage medium has been known for many years. Frequently, the magnetic tape is provided within some type of removable cartridge. This cartridge is designed to be inserted into a tape drive to access or store the information on its magnetic tape. One of the popular applications for this tape storage is as a computer memory backup. In this application, often large amounts of data contained within a computer memory are copied to the magnetic tape media so as to be available in the event the main memory (typically a hard disc) malfunctions. By the very nature of this application, it is desirable to store as much information on the magnetic tape media as possible. To do this, a variety of tracks are employed on the magnetic tape media. These tracks are accessed magnetically through a tape head which physically moves from one track to another during operation. Since the number of tracks is maximized, the physical movement of the tape head must be very precise. Not only must the movement accommodate the variations inherent in the placement of a removable magnetic tape cartridge, but it must also accommodate manufacturing variations and mechanical movement practicalities in a cost effective and quick manner. Not only must the tape drive mechanism achieve extremely accurate movement of the tape head across the magnetic tape media, but the magnetic tape media itself must be moved lengthwise across the tape head in an extremely accurate fashion.

As to each of these aspects, those skilled in the art of designing magnetic tape drives have developed a practice of physically calibrating each tape drive after manufacture for optimum track positioning and the like. This calibration has been achieved both mechanically and electrically. Mechanically it has been known to utilize microscopic alignments of the tape head to a set reference position. This approach when used in conjunction with more accurate mechanical components has greatly increased the precision with which the tape head can be controlled. Unfortunately, neither the utilization of an accurately located reference position or the use of extremely precise components achieves the goals sought in a manner which is both cost effective and practically implemented. For this reason, it has become fairly common to utilize electrical techniques which may be programmed into a computer and available throughout operation. In general, these techniques involve sensing some inserted feature (such as the center of a track or the edges of the magnetic tape media) to then determine some correction to apply in operation. Incorporating by reference U.S. Pat. No. 4,679,104 to Dahlerud, it can be seen that one refinement of this technique can involve sensing the center of each track and then storing some correction for each track. As this reference explains, interpolation can also be included in certain circumstances. Similarly, U.S. Pat. No. 4,802,030 to Henry and the references cited therein show other techniques used to establish accurate positioning of the tape head with respect to a magnetic tape media.

In spite of the fact that a variety of techniques and devices have addressed the problem of accurate positioning of the tape head, mechanical accuracies to the degree desired have not been achieved. As the present invention discloses, this has been due in part to the fact that those skilled in the art focused on mechanical solutions to these particular inaccuracies rather than calibration solutions.

As to the calibration challenge faced by those trying to control the speed at which the magnetic tape media moves in front of the tape head, an entirely different approach has been taken. Since the speed is controlled through a drive wheel which actually contacts components within the tape cartridge itself, it has become common to manufacture this drive wheel to extremely close tolerances. In spite of the approach taken with respect to other components within a magnetic tape drive, this drive wheel has been manufactured or machined to be of exactly the correct dimension. While this solution has for the most part been satisfactory from a technical perspective, for practical reasons including the expense involved, this solution has not been optimum. Again, the present invention achieves a solution which is acceptable from both technical and practical perspectives.

As the scope and extent of the prior art in this field demonstrates, the desire for more accurate control of the actual location of the tape head has been a long felt but not completely satisfied need. Perhaps surprisingly, as the description of the preferred embodiment of the present invention shows, this need has not been satisfied in spite of the fact that the implementing arts and elements had long been available to those skilled in the art. The elusiveness of the solution posed by the present invention, has perhaps been due to the fact that those skilled in the art failed to appreciate that non-repeatable errors could be handled to a large extent by a calibration solution. Thus, the techniques suggested involving interpolation and the like have actually taught away from the technical direction taken by the present invention.

Similarly, the practical problems posed by the control of the movement of the tape across in front of the tape media have also remained unsatisfied even though the implementing arts have long been available. In this regard, while the technical problem seems to have been well understood, the practical problem of achieving a solution in a cost-effective manner has not been recognized. Again, the approach taken in the prior art has focused on an accurate technical solution and thus actually taught away from the direction taken by the present invention in its implementation of corrections to admittedly imperfect designs. Although the present invention achieves its solutions in a manner which had long been available to those skilled in the art, they simply failed to recognize the availability of these solutions to solve the practical problems involved.

SUMMARY OF THE INVENTION

The present invention provides calibration techniques and system designs which can sense both actual position of a tape head and actual tape drive speed. The invention then uses these values to create correction factors to achieve accurate operation. As to the tape head calibration, the invention avoids merely testing track locations and instead places the head in continuous motion across the tape while sensing a great number of actual positions throughout this motion. These actual positions may then be processed to remove effects of a non-repeatable nature to achieve a more accurate correction factor throughout operating cycles. This processing may use techniques such as curve fitting and can then create and store correction factors for each track in the typical manner. As to the tape speed calibration aspect, the present invention involves utilizing the existing drive components to sense actual speed and then compare that to the preferred speed. Similar to the manner in which the tape head is more accurately controlled, a correction factor is then derived and applied to the tape drive motor for accurate speed control of the particular drive by adjusting speed coefficients.

Accordingly, it is a general goal of the present invention to provide an optimum calibration technique which has the capability of removing mechanical, manufacturing, and other variations. In keeping with this general goal, the invention recognizes and removes non-repeatable errors which may exist. Additionally, the invention has as a goal to remove one or many specific mechanical process impacts as appropriate with or without specifically identifying those processes. Similarly, a goal is to avoid inaccuracies introduced by the assumption of a linear or otherwise predictable mechanical system. It is also a goal to provide for a variety of filtering and other techniques through which programming or designs can be modified to more appropriately correct for the specific mechanisms involved.

Another goal of the present invention is to achieve its techniques and solutions in a manner which minimizes time and cost impacts during manufacture. Accordingly a goal of the invention is to utilize a single measuring event to generate sufficient information from which correction factors can be derived. In addition, the invention attempts to minimize the need for additional equipment. Thus the invention utilizes actual operating conditions and equipment in both the sensing and calibration phase to the largest extent possible. Similarly, the invention is designed so it can be implemented through either programming of existing computer or programmable processor capabilities or through hard wired designs. The invention has as another goal to minimize the manufacturing impact by minimizing the amount of steps and the cost of the modification necessary for the tape drives and by minimizing the amount of time necessary to achieve calibration through the use of quick, single-event calibration operations.

Yet another general goal of the present invention is to provide designs which can be adapted and which can accommodate a variety of computer and tape drive configurations. Thus a goal is to accommodate the variety of existing cartridges as may exist and to function through the various computer interfaces possible.

Naturally further objects of the invention are disclosed throughout other areas of the specification and claims.

DETAILED DESCRIPTION OF THE PREFERRED EMBODIMENT

Figure 1:
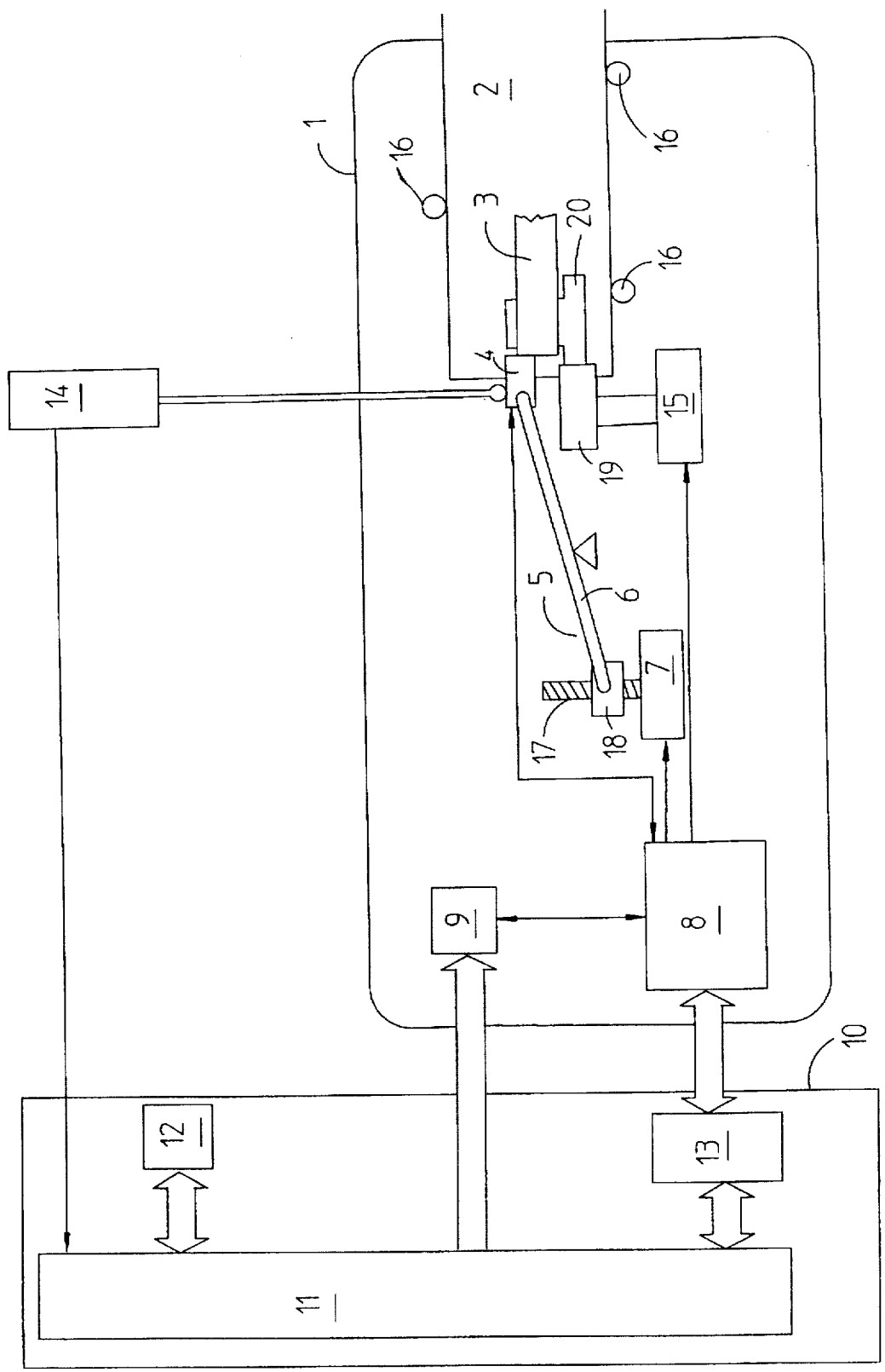
FIG. 1 is a schematic representation of an embodiment of the calibration system.

As can be seen from the drawings, the basic concepts of the present invention involve both methods and apparatus for calibration of a tape drive. Referring to FIG. 1, a schematic representation of one embodiment, both the general tape drive and the calibration system can be understood.

As shown, magnetic tape drive (1) operates in conjunction with tape cartridge (2) to both store and access information contained in some format on magnetic tape media (3). Tape cartridge (2) is designed to be removably inserted within magnetic tape drive (1) through the use of guides (16). As shown, when inserted, magnetic tape media (3) is positioned to some degree of accuracy within a repeatable range of locations relative to the magnetic tape drive (1) next to tape head (4). As those skilled in the art are well aware, tape head (4) acts to read or write data by responding to or changing the magnetic characteristics of magnetic tape media (3). This data is then transferred from tape head (4) to some device, potentially computer (10). As shown in FIG. 1, the impulses or signals representative of the data would transfer from tape head (4) through controller (8) and floppy disk interface (13) to ultimately be accessed and utilized by programmable processor (11) within computer (10).

As is well known, magnetic tape media (3) often involves a number of tracks along its width. In order to access these tracks, tape head (4) is designed to be moveable across magnetic tape media (3). This is accomplished through some head drive mechanism (5). As shown, head drive mechanism (5) can involve stepper motor (7) which may act to turn threaded shaft or lead screw (17) and thus move nut (18) by some increment. Nut (18) may be connected in some fashion such as by pivot arm (6) to tape head (4) to cause the proper motion as desired. While one specific head drive mechanism is shown, it should be understood that other types of drive mechanisms are possible in order to reposition tape head (4) with respect to magnetic tape media (3). Each would naturally be deemed an equivalent of the mechanism shown.

As also shown, it can be understood that stepper motor (7) may act in response to some external signal or command. As shown in FIG. 1 this command may come from controller (8) which may further act in response to computer (10) potentially through floppy disk interface (13). Naturally, the specific connections or source of this command or signal may also be varied. It may come directly from programmable processor (11) or may even be in response to some hard wired arrangement as those skilled in the art would readily understand.

Within magnetic tape drive (1) there may also be some memory (9). This memory may be available to controller (8) for a variety of purposes. With respect to the present invention, it may serve to store the calibration information for operation of magnetic tape drive (1). Additionally as shown, it can be seen that computer (10) also contains computer memory (12) which is shown as being available to programmable processor (11). By virtue of the connection shown through floppy interface (13) and controller (8), computer memory (12) can also be accessible to controller (8). Thus, as true to all aspects of this invention, it is the function, not the location or configuration of any specific memory or other component which is relevant to the present invention.

As mentioned earlier, one of the challenges faced by those skilled in the art is the accurate positioning of tape head (4) with respect to magnetic tape media (3). Unfortunately due to the tolerances now demanded by those skilled in the art, it is not sufficient to merely estimate the position through counting the number of steps or motions of stepper motor (7) for all machines manufactured. Instead, it has become a standard in the art to specifically calibrate each machine to accommodate variations between the predicted and actual positions which result from variations in pivot arm (6), stepper motor (7), and other such components. Prior to the present invention, this has usually been accomplished by positioning tape head (4) at a specific track location and then recording the predicted position and applying the appropriate correction factor. This technique, however, has not provided the degree of accuracy desired for reasons which the present inventor has discovered. It has also been slower than the technique of the present invention. With respect to the accuracy achieved, the present invention results to some degree from the realization that there are significant, non-repeatable errors inherent in head drive mechanisms which can cause substantial variation in actual application. This is shown in FIG. 3.

Figure 3:
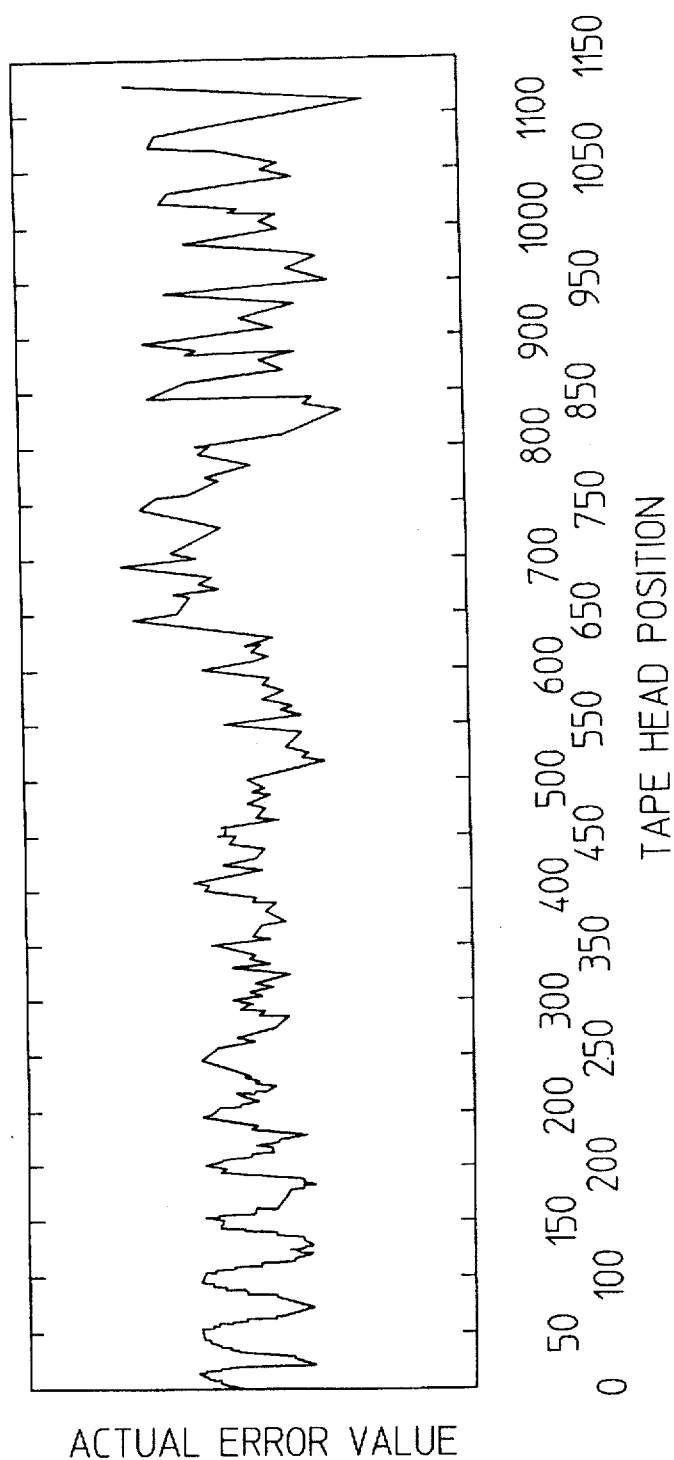
FIG. 3 is a representation of actual error values as a function of tape head position.

Referring to FIG. 3, it can be seen how an actual error value varies with specific tape head position. In this figure, the horizontal axis, tape head position, represents the predicted position of tape head (4) through operation of counts or steps of stepper motor (7). The vertical axis represents an actual error value or the deviation from a predicted value based on ideal mechanical components. For instance, although the tape head position shown in FIG. 3 would ideally vary linearly from zero through 1150 steps, in an ideal case the actual error value would be zero and the plot would be a horizontal line. This would mean that tape head (4) moves precisely in a linear fashion across magnetic tape media (3). As shown in FIG. 3, this is not the case. Perhaps surprisingly, FIG. 3 shows both random and periodic variations. Even those errors appearing to be periodic can, in application, be non-repeatable due to uncertainty in the placement of tape cartridge (2), wear, and the like. In its simplest form, the aspect of the present invention involving movement of tape head (4) merely accounts for these variations. It also does so in a fashion which recognizes the reality that tape cartridge (2) and magnetic tape media (3) can only be positioned within magnetic tape drive (1) to some degree of accuracy or repeatable range of locations relative to the magnetic tape drive and that positioning and/or mechanical movements can change over time. The variation in positioning or repeatable range can be represented by a range of predicted tape head position. This range can be as much as 50 steps on the scale of that shown in FIG. 3. As can be understood, this large a variation contributed to the concept of processing the actual error values to create position or correction values which are more appropriate for utilization from one application to the next. While an alternative technique might involve repetitively sampling actual error values to arrive at an appropriate value with different insertions and different tapes involved, and throughout an anticipated lifetime of the device, the present invention allows quick calibration through a single measuring event and processing and filtering techniques. It thus can remove non-repeatable effects. As mentioned earlier, the realizations of the present invention actually take a different direction than those of the prior art in which interpolation was deemed to be an accurate way to estimate proper calibration.

As FIG. 3 shows, both relatively high and medium frequency errors can exist. As shown through the actual error values corresponding to tape head positions 300 through approximately 340, a relatively high frequency error can exist. Similarly, the large variations present from tape head position zero through 100 can represent relatively medium frequency errors. Since adjacent tracks can be positioned approximately 50 steps apart, and since the repeatable range of actual placement of magnetic tape media (3) can be varied by a similar amount, it can be understood how it may be desirable to eliminate both high and medium frequency errors. Naturally, for applications having closer tolerances, only high frequency errors might be eliminated as well.

Although it is believed that such errors are a result of specific mechanical processes, the exact source of the error need not even be known. As shown, medium frequency error is believed to represent an error introduced by the rotation of threaded shaft or lead screw (17). Importantly through the techniques of the present invention, it is not necessary to know the exact source of the mechanical error in order to achieve the solutions disclosed. Similarly, filtering can accommodate wear-induced changes including such changes as the amplitude or location of the actual error values shown in FIG. 3.

In FIG. 1 sensor (14) is included to accurately measure the actual position of tape head (4). These position values can then be provided in some fashion for proper control of stepper motor (7). These actual position values can be input to programmable processor (11) within computer (10) in one embodiment. Thus sensor acts to record actual position values from which actual error values as shown in FIG. 3 can be deduced.

Figure 2:
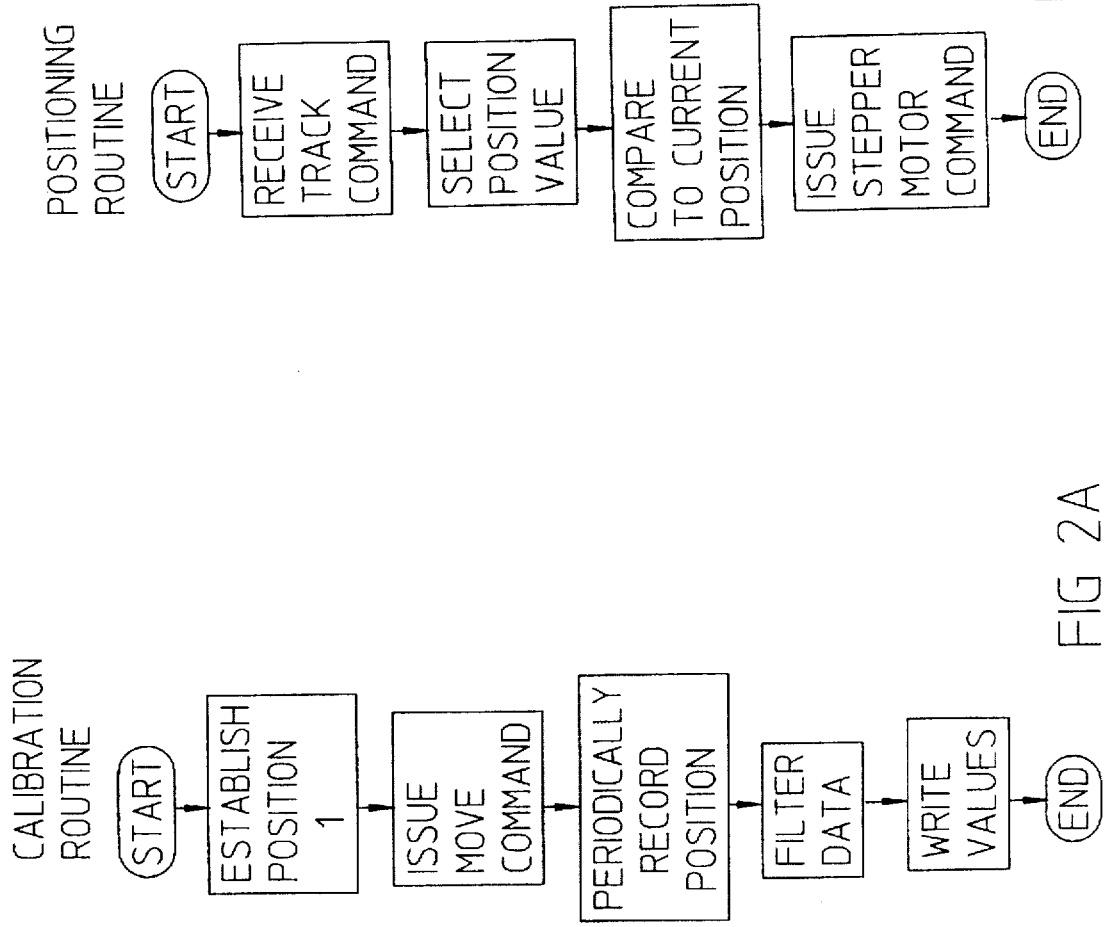
FIGS. 2a and 2b are flow charts of the processes used in one embodiment of the invention.

Referring to FIG. 2a, it can be understood how a calibration routine can be accomplished. Initially, tape head (4) is established at some first position. Naturally this first position may involve movement of tape head (4) to one edge of the tape, one track, or other location. It also encompasses simply accepting the existing position of tape head (4) resulting from initial manufacture. Tape head (4) is then moved in a substantially continuous motion by the operation of head drive mechanism (5). Importantly, by utilizing head drive mechanism (5), actual motion is detected. In addition, unlike the techniques of the prior art, tape head (4) is moved in substantially continuous motion. By these terms, two aspects are meant. First, tape head (4) is not subject to repeated step commands in the traditional sense. This is significant since repeated step commands can be time consuming and are particularly so when magnetic tape drive (1) is connected through floppy disk interface (13) for reasons those skilled in the art readily understand. To minimize this time, movement rather than repeated steps is preferred. This does include the use of repeated step commands if used to achieve substantially continuous motion, that is motion which does not have visually perceptible stopping points (even if actual steps do occur). Second, by moving tape head (4) in a continuous fashion, the amount of time necessary to acquire actual position values is minimized. Although each of these aspects might seem unremarkable at first glance, it should be understand that typical operation of magnetic tape drive (1) through floppy disk interface (13) as dictated by industry standards does not even include a move command. Hence, as shown in FIG. 2a, the step of issuing a move command can require the creation of such a command. This step can be accomplished by either programmable processor (11) or controller (8) which, in this configuration, would serve as a means for moving the tape head. Naturally, other components and even hard wired designs could also serve this purpose. Although the creation of such a command is well within the skill of those in the art, the fact that industry standards have not included such a command has lead those away from the direction taken by the present invention.

In addition to the step of moving tape head (4) in substantially continuous motion, the invention may also include the step of setting the speed at which to move the tape head. This may be accomplished once, for instance as part of setting up the calibration programming, or may be accomplished individually for each drive. While, given the goal of the fastest calibration possible, one might initially expect to move tape head (4) at its maximum speed, it has been discovered for some applications this can be undesirable. Specifically, it has been discovered that first sensing the maximum speed at which movement can occur without any missed steps and then reducing this by approximately 50% provides an optimum speed to sense the most accurate actual position values in a reasonably short period of time. Additionally, the motion of tape head (4) can be throughout substantially the entire range of normal operation such as from top to bottom track or from top to bottom edges of magnetic tape media (3). In this fashion, actual position values can be obtained with a minimum of estimation.

As mentioned earlier and as shown in FIG. 1, sensor (14) is utilized to sense actual position values of tape head (4) relative to a fixed reference with respect to the magnetic tape drive (1). Since tape head (4) is moved in substantially continuous motion, it is important that sensor (14) be of sucha character as to afford substantially instanteous position values. In this fashion, sensor (14) can either periodically output values or be read so as to periodically record actual position values. Repeated prompting is also possible. As shown in FIG. 1, these values are made available to programmable processor (11) within computer (10). The corresponding tape head position steps can be deduced based on timing and the like. These actual position values can then be utilized to create actual error values as shown in the data presented in FIG. 3. Importantly, as can be appreciated from the variation in data shown in FIG. 3, a substantial number of actual position values may be desirable. Although in many prior art devices, only one actual position value corresponding to each track was read, in the present invention a variety of values are recorded. This number may be merely greater than the number of tracks present or twice the number of tracks, however, as shown in FIG. 3, approximately 500 values have been utilized. Again, through the use of substantially continuous motion these values can be measured through primarily a single calibration event, namely, a single motion of tape head (4). Again, while repetitious testing could also be accomplished, in the interest of providing a calibration in the shortest possible time, only one motion need be accomplished.

Generally, the invention can then utilize the actual position values to establish proper positioning of tape head (4). As contemplated with respect to the system shown in FIG. 1, these actual position values can be processed or utilized through programmable processor (11). In this fashion when appropriately programmed or configured through subroutines or the like, programmable processor (11) can serve as a means for utilizing the actual values to establish proper positioning of tape head (4). This can be accomplished by first reading the actual position values into computer memory (12) and then accessing computer memory (12) through programming of programmable processor (11) so as to process these values and then provide them through floppy disk interface (13) and controller (8). Controller (8) may likewise store either actual position values or processed values within memory (9) for use during operation. As shown in FIG. 1, programmable processor (11) can directly access memory (9). Memory (9) may include a read only memory to store the calibration result. In this manner, programmable processor (11) can be configured so as to allow the initial configuration of a read only memory during calibration. As those skilled in the art would readily understand although the configuration shown in FIG. 1 is one type of configuration, naturally other configurations could be utilized and even hard wired as a system. Also it should be understood that although the components are mentioned as providing values to other components, what is actually provided are signals representative of those values. Thus the responsiveness of one component to a value also includes responsiveness to a signal representative or processed based upon of such value. In addition, although the arrows indicating connections or data flow are shown in some instances in only one direction, other directions and multiple directions are possible and fall within the scope of the present invention as those skilled in the art would readily understand.

As alluded to earlier, programmable processor (11) can be configured so as to process the actual position values to obtain either position values or correction values. It should also be understood that such processing need not occur as actual position values can be utilized to a large extent as well. If processed, programmable processor (11) can serve as a means for creating either position or correction values. These values can be correlated with the specific tracks for utilization during normal operation of magnetic tape drive (1). Processing can include a variety of operations such as elimination of specific values, addition of values, and the adjustment of values such as a filtering capability. In the instance where position or correction values are created by programmable processor (11), these different values can then be read into memory (9) so that memory (9) acts responsive to the means for creating.

Referring to FIG. 2a, it can be seen how after periodically recording the actual position values, the step of filtering data can be achieved. Naturally this filtering can include a great variety of data manipulation techniques. In the preferred embodiment, some type of curve fit is utilized. Although a fifth-order polynomial curve fit is utilized, other filtering such as sliding window or running average filtering is also possible and would fall within the broad scope intended by the step of filtering the data. Naturally this filtering can occur either before or after storing data. The resultant data can then be correlated with the specific tracks. In the preferred embodiment, after smoothing the data, specific values are determined based on anticipated location of each track. These values are stored in a correlated fashion with the track number. Thus, memory (9) actually contains a table of track number versus a position value. This position value is actually a position increment for the indicated track with respect to a specific referenced track such as track zero. Again, since programmable processor (11) can also be configured in a variety of manners, programmable processor (11) can serve as a filter. Again, as those skilled in the art would readily understand a variety of filters are also possible including hard wired devices. Also, this filtering can occur at any point in either the calibration or operation modes and can even be varied during use.

Importantly, either processing or filtering can be achieved in a fashion so as to remove specific effects. These effects can include mechanical processes whether known or not, and can include non-repeatable effects, namely, those effects which will not reliably occur with respect to magnetic tape media (3) from one utilization to the next due to a variety of effects such as, but not limited to, the effect of variation in the positioning of tape cartridge (2) and magnetic tape media (3) with respect to tape head (4). By non-repeatable effects, not only are mechanically induced effects included, but effects which are a function of time, temperature and any other seemingly random variation are intended to be included. To the extent these effects could be measured, naturally they could be included in a determination as to which particular value to utilize for a specifics track. For instance, it would be possible to sense the lead screw position or even actual condition or newness of the mechanism through sensing the number of cycles to which it has been subjected. This condition could then be stored and available to magnetic tape drive (1) so that in the event a variety of correction values were stored for each track, the proper correction value could be selected. Additionally, further processing could be achieved to adjust stored values as one skilled in the art would readily understand.

When configured or programmed to remove such effects programmable processor (11) serves as a means for removing specific effects. Additionally, when removing such effects, it is possible to limit these effects to those which either have no periodic variation or those which have a periodic variation where the period or width of such variation is substantially smaller than the amount of variation in the placement of magnetic tape media (3) with respect to tape head (4). Thus this placement variation, referred to as a repeatable range, can determine the size of the effects which are removed. Naturally, effects substantially smaller than this repeatable range, such as those referred to previously as high frequency variations can be removed. Additionally, larger effects such as that referred to earlier as a medium frequency variation can also be removed in instances when this effect is not significantly larger than the repeatable range within which tape cartridge (2) and magnetic tape media (3) can be positioned.

As the flow chart in FIG. 2a shows, after processing or filtering the actual position values, programmable processor (11) can then write or store the values. As shown in FIG. 1, these values may be written to memory (9) and may be available during operation in a variety of manners. The manner of operation utilized by the preferred embodiment is shown in FIG. 2b. First, as is well understood in the art, magnetic tape drive (1) receives a track command or some type of command which is designed to assure appropriate positioning of tape head (4) with respect to magnetic tape media (3). In the preferred embodiment, this command causes selection of the specific position value corresponding to the desired track. Since the storage technique utilized in the preferred embodiment is to store position values indicative of the number of steps of movement from the reference track zero, this position value would then be compared to the current position in order to achieve the amount of steps necessary to move from the current position to the desired position. Finally to achieve this movement this number of steps would then be triggered in stepper motor (7) via some command. While in the preferred embodiment this is achieved through programming of either programmable processor (11) or controller (8), naturally these types of commands could either be hard wired or achieved through other software programming. In order to minimize the amount of interaction necessary through floppy disk interface (13), in the preferred embodiment, these processes are achieved through operation of controller (8).

As alluded to earlier, the actual error values can be refined or selected in response to a variety of factors. For instance, memory (9) could store a variety of correction values appropriate to the actual positioning of tape cartridge (2) and magnetic tape media (3) with respect to tape head (4). In this fashion, controller (8) could then select the particular value appropriate given the current position of these components as measured by tape head (4). Likewise, a variety of values could be selected based upon the position of threaded shaft (17), the number of cycles through which magnetic tape drive (1) has been operated or any other variable which can be discerned. In this fashion the invention can be adapted to utilize actual positions or conditions to select the appropriate correction value. Importantly this departs from the approaches used in the prior art where only singular corrections were utilized in positioning a tape head. According to this aspect, a number of correction values for various tracks or other elements could be established and selected based upon an actual position or other criterion.

Referring again to FIG. 1, it can be seen that magnetic tape media (3) moves in front of tape head (4) through the operation of motor (15). This motor is connected in some fashion as shown for simplicity through drive wheel (19) and tape wheel (20) to cause movement of magnetic tape media (3). Naturally, motor (15) may be operated through controller (8) as well known in the art. Importantly, the movement of magnetic tape media (3) is desired to be conducted at a preferred speed. Although this speed has been precisely controlled through accurate manufacture of drive wheel (19), the general principles involved in the present invention with respect to tape head (4) can also be adapted to control the exact speed at which magnetic tape media (3) moves in front of tape head (4). This can be accomplished through operation of tape head (4) by utilizing a standardized signal often present on some magnetic tape media. This signal should have some frequency component which could be sensed through operation of tape head (4). In the event of any speed difference, naturally the frequency component sensed by tape head (4) would vary from that actually written on magnetic tape media (3). This variance could then be used to adjust the speed coefficient which controller (8) utilizes for motor (15). This adjustment would then shift the apparent frequency sensed by tape head (4) so that its frequency would exactly coincide with the desired frequency thus indicating that the speed at which magnetic tape media (3) was moving across tape head (4) would coincide with the preferred speed. Since it is well known by those skilled in the art to utilize different speed coefficients for different operations of magnetic tape drive (1), the small adjustment necessary to adjust and calibrate magnetic tape drive (1) can be easily accomplished. Similar to the calibration achieved with respect to tape head (4), it can be understood how one calibration event could be used to alter a number of speed coefficients by a consistent percentage thus achieving appropriate speed at the various levels desired. This operation could naturally be achieved either by controller (8) or programmable processor (11). As such, either programmable processor (11) or controller (8) could serve as a means for measuring the actual speed at which magnetic tape media (3) is moved by motor (15). Through operation of other subroutines or programming, programmable processor (11) or controller (8) could serve as a means for comparing the actual speed with a preferred speed. In addition, the preferred speed could be represented by a known frequency value stored within some memory such as computer memory (12) or memory (9). Naturally, this calibration could be repeated whenever desired as it would not be dependent on a separate apparatus such as tape head calibration. The use of a preexisting tape signal is possible because many tapes have a standardized reference burst having some frequency component available to them. In addition, of course, a signal having varying frequencies could also be used.

With reference to the claims, it can be seen that in many instances, one element is responsive to another element. This is meant in its broadest sense. For instance, since sensor (14) outputs some values which ultimately impact the operation of stepper motor (7), stepper motor (7) should be deemed responsive to sensor (14). This is in spite of the fact that the output may be filtered through programmable processor (11), may be further transformed through floppy disk interface (13), may then be utilized by controller (8) in conjunction with memory (9) and then arrive at a signal provided to stepper motor (7). In the broad sense intended, all that is necessary for this example is that stepper motor (7) vary its operation based upon the output of sensor (14) in order to be deemed "responsive" to sensor (14). Intermediate processing or manipulation would not impact this responsiveness. Similarly, as those skilled in the art would understand, many steps in the techniques discussed can be accomplished at varying points in time and in varying orders. Naturally each such variation would fall within the scope of this patent.

The foregoing discussion and the claims which follow describe the preferred embodiments of the present invention. Particularly with respect to the claims, it should be understood that changes may be made without departing from their essence. In this regard, modifications and changes falling within the scope of this patent are not to be limited by the particular apparatus or steps selected as the preferred embodiment. Rather, such modifications and changes as would be known to those skilled in the art to achieve the same function should be deemed to fall within the scope of the claims of this patent. This is particularly true in reference to those elements described as a means for a particular function since, as those skilled in the art would readily understand, software and hardware embodiments are possible. Naturally, to the extent such revisions utilize the essence of the present invention it is intended that they would fall within the breadth of protection encompassed by this patent.

I claim:

1. A method of calibrating a mechanism for driving a magnetic head in a magnetic tape drive, the method comprising the following steps:

moving the magnetic head, with the mechanism, in a substantially continuous motion, over a plurality of tracks;

measuring a number of actual position values of the magnetic head during the movement of the magnetic head, wherein the number of actual position values measured is at least twice the number of tracks in the plurality of tracks;

filtering the actual position values;

computing track position values from the filtered actual position values; and storing the computed track position values.

2. The method of claim 1, the step of filtering further comprising removing the effects of at least one mechanical process.

3. The method of claim 1, the step of filtering further comprising removing non-repeatable effects.

* * * * *